UNITED STATES PATENT OFFICE.

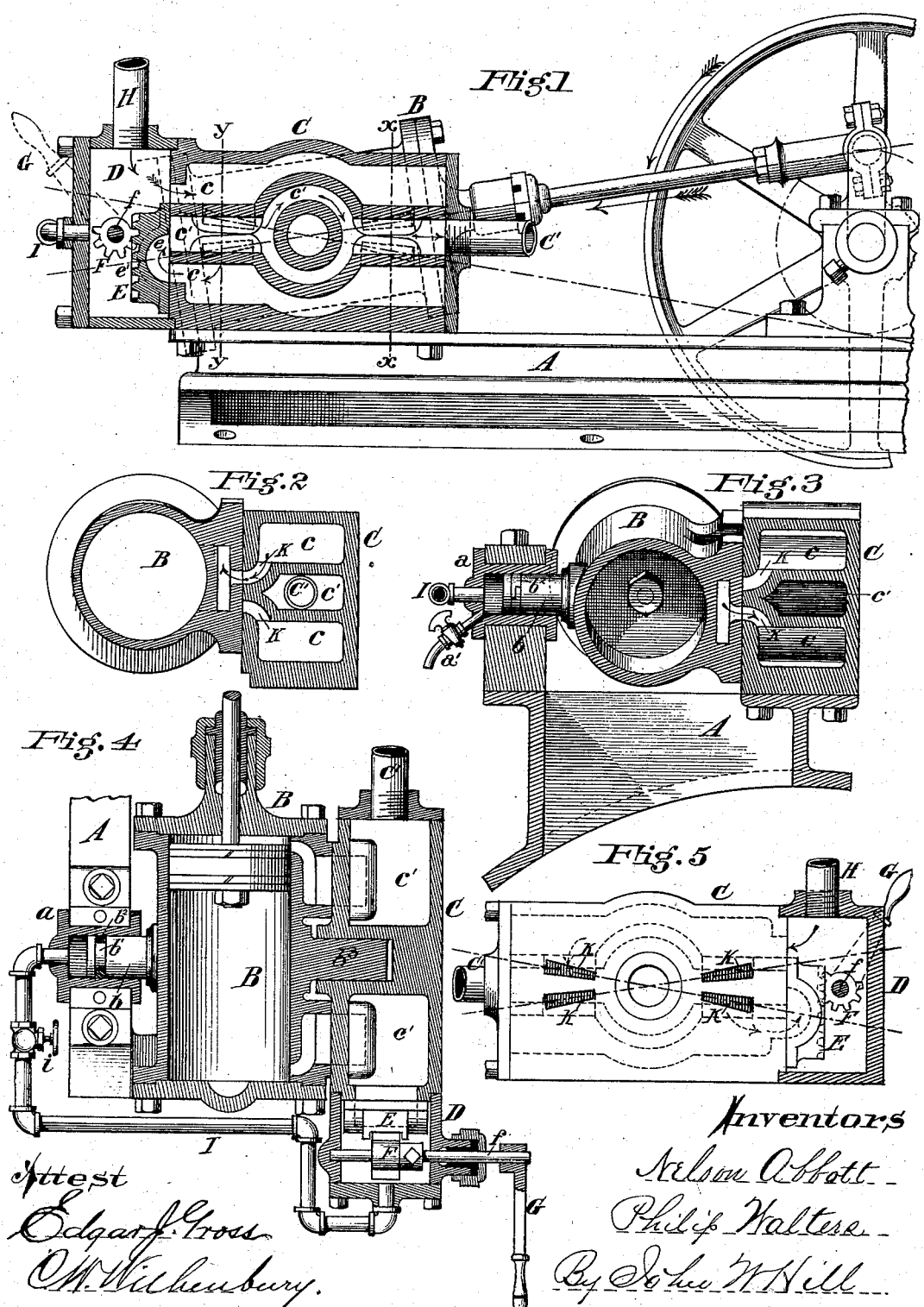

NELSON ABBOTT AND PHILIP WALTERS, OF MANSFIELD, OHIO.

REVERSING-GEAR FOR STEAM-ENGINES.

SPECIFICATION forming part of Letters Patent No. 242,851, dated June 14, 1881.

Application filed March 23, 1881. (No model.)

*To all whom it may concern:*

Be it known that we, NELSON ABBOTT and PHILIP WALTERS, of Mansfield, in the county of Richland and State of Ohio, have invented certain new and useful Improvements in Reversing-Gear for Steam-Engines, of which the following is a specification.

Our invention is in the nature of an improvement upon that class of oscillating engines which are designed to run backward and forward at the will of the operator, and has for its object the construction and arrangement of the steam-cylinder, steam-chest, and reversing-gear in such a manner as to avoid the use of eccentrics, links, slide-valves, rods, and all the customary hamper of engines of this class.

The improvements will be fully hereinafter described in detail, and specifically pointed out in the claims.

In the accompanying drawings, Figure 1 is a vertical section through the steam-chest and valve-box of an engine containing our improvements. Fig. 2 is a section on line $x\ x$ of Fig. 1. Fig. 3 is a section on the line $y\ y$, Fig. 1. Fig. 4 is a horizontal section of the cylinder, steam-chest, and valve-box on the axis of the cylinder; and Fig. 5 is an elevation of the steam-chest and reversing-valve.

Similar letters of reference indicate similar parts.

A is the bed-plate or frame of an oscillating engine, which may be arranged for one or two cylinders, and may be of such a form as to mount upon the customary masonry or wooden foundation, or upon the boiler of a portable engine.

B is the cylinder, furnished with a piston arranged to connect with the crank of the fly-wheel shaft, in the usual manner.

C is the steam-chest, which is substantially rectangular in form, and is sustained and supported at its lower edge by the bed-plate A, being secured thereto by tap-bolts. The side of the steam-chest is accurately surfaced to form a steam-joint when in contact with the valve-seat on the cylinder.

$c$ and $c$ are the upper and lower ports or passages, which alternately serve to convey steam to and the exhaust from the cylinder B. $c'$ is the central passage in connection with the exhaust-pipe $C'$. These ports or passages $c\ c\ c'$ are substantially parallel with each other and extend longitudinally along the steam-chest.

D is the valve-box attached to the steam-chest, as shown. E is the slide-valve, provided with the usual cavity, $e$, to connect the ports $c$ or $c$ with the port $c'$, and worked by the rack $e'$, pinion F, shaft $f$, and lever G. H is the steam-pipe secured by screw or flange joint to the valve-box D.

$a$ is the cylindrical bearing for the trunnion $b$ of the cylinder, secured to the bed-plate A by any of the usual devices. In the trunnion a groove, $b'$, is turned for the reception of the packing-ring $b^2$.

I is a small steam-pipe, connected with the valve-box D, through which steam is supplied to the cylindrical bearing $a$. A valve or cock, $i$, in the pipe I permits the shutting off of steam from the bearing. A drip-cock, $a'$, in the bearing serves to draw off the condensation which will accumulate therein. The opposite trunnion, $b^3$, of the cylinder is sustained solely by the steam-chest C, said trunnion resting in a closed socket in said chest, and as the latter is rectangular in form and rests at its lower edge on the bed-plate A, it is firmly supported and sustained, and therefore it is not necessary to provide other supports for the trunnion $b^3$.

Steam-ports K K K K into the passages $c$ and $c$ are provided, through which steam flows from the upper passage $c$, Fig. 1, through corresponding ports into the cylinder B, and through which the exhaust from the cylinder flows into the lower passage $c$, thence through the cavity $e$ in the under side of the valve E, and into the central passage, $c'$, which is in communication with the exhaust-pipe of the engine. When the slide-valve E is drawn up the operation of the motion of the engine is reversed, steam being delivered to the cylinder through the lower passage $c$, while the exhaust passes out through the upper passage $c$. When the slide-valve is set at mid-travel both ports $c$ and $c$ are closed, and no admission of steam to either passage is possible. When the piston is at mid-stroke in one direction the port at one end of the cylinder is in communication with the steam-passage $c$ and the port at the opposite end of the cylinder is in communication with the exhaust-passage $c$ and central exhaust-passage, $c'$. When the piston is at the opposite half-stroke the position of the ports is reversed, that one which before was receiving steam from the steam-passage $c$ is now in communication with the exhaust-passage $c$, and vice versa.

It is obvious that in whatever position the engine is placed, with one port into the cylinder receiving steam, the port at the opposite end of the cylinder will be exhausting into one of the passages $c$, and, if the slide-valve E be moved to the opposite extremity of its travel, the passage $c$ which before was in communication with the valve-box D being placed in communication with the exhaust-passage $c'$, and the opposite passage $c$, which before was in communication with the exhaust-passage $c'$, being placed in communication with the valve-box D, that the functions of the passages $c$ and $c$ and the motion of the engine will be reversed, for with the engine in any position that port into the cylinder which before was in communication with the live steam in the passage $c$ is now, by the change in the position of the slide-valve, in connection with the exhaust-passage $c$, and vice versa.

The contact between the valve-seats on the cylinder and on the steam-chest being maintained by steam direct from the valve-box D, it is obvious that the pressure which subsists in the passage $c$ and presses the cylinder B from the seat is resisted by the same pressure in the cylindrical bearing $a$ which presses upon the end of the trunnion $b$, the area of which is greater than the area of the steam-ports K K in either of the passages $c$ and $c$, and a steam-tight joint maintained between the stationary seat on the steam-chest and the working-seat on the oscillating cylinder.

We are aware that it is not new to combine a reciprocating slide-valve with a steam-chest and an oscillating cylinder, and therefore we make no broad claim to such features; but, Having described our invention, what we claim is—

1. In an oscillating engine, the rectangular steam-chest C, sustained by the bed-plate and forming the sole support for the trunnion $b^3$ of the oscillating cylinder, said chest being formed with the upper and lower and intermediate passages, $c\ c\ c'$, which extend longitudinally along the length of the chest, in combination with the slide-valve E, arranged in a valve-box, D, secured to the end of the steam-chest, and the exhaust-pipe C, attached to the opposite end of the steam-chest and communicating with the intermediate passage, $c'$, substantially as described.

2. The combination of the oscillating piston-cylinder, the steam-chest C, fitted to one side thereof, and formed with the upper and lower ports, $c\ c$, extending lengthwise of the chest, and communicating with the cylinder through ports K K, and the passage $c'$, extending longitudinally between the upper and lower ports, with the slide-valve E, arranged in the valve-box D at one end of the chest, and provided with the cavity $e$ and the rack $e'$, the pinion F, the shaft $f$, and the lever G, all constructed and arranged to operate substantially as described.

In testimony whereof we have signed our names to the foregoing specification in the presence of two subscribing witnesses.

NELSON ABBOTT.
PHILIP WALTERS.

Witnesses:
C. W. WITHENBURY,
EDGAR J. GROSS.